US012544287B2

(12) United States Patent
Lin

(10) Patent No.: US 12,544,287 B2
(45) Date of Patent: Feb. 10, 2026

(54) CARRYING MODULE AND AUXILIARY TOOL USING SAME

(71) Applicant: FULL CARE TECHNOLOGY CO., LTD., Taichung (TW)

(72) Inventor: Tsung-Yi Lin, Tainan (TW)

(73) Assignee: FULL CARE TECHNOLOGY CO., LTD., Taichung (TW)

( * ) Notice: Subject to any disclaimer, the term of this patent is extended or adjusted under 35 U.S.C. 154(b) by 33 days.

(21) Appl. No.: 18/697,451

(22) PCT Filed: Sep. 29, 2021

(86) PCT No.: PCT/CN2021/121952
§ 371 (c)(1),
(2) Date: Mar. 29, 2024

(87) PCT Pub. No.: WO2023/050228
PCT Pub. Date: Apr. 6, 2023

(65) Prior Publication Data
US 2025/0000731 A1 Jan. 2, 2025

(51) Int. Cl.
*A61G 7/10* (2006.01)
*A61G 5/10* (2006.01)
(Continued)

(52) U.S. Cl.
CPC ............. *A61G 7/1042* (2013.01); *A61G 5/14* (2013.01); *A61G 7/1007* (2013.01); (Continued)

(58) Field of Classification Search
CPC ...... A61G 7/1042; A61G 5/14; A61G 7/1007; A61G 7/1046; A61G 7/1059;
(Continued)

(56) References Cited

U.S. PATENT DOCUMENTS 4,155,588 A * 5/1979 Danziger ............. A61G 5/1094
5/81.1 R
5,176,706 A * 1/1993 Lee .......................... A61H 1/02
606/241
(Continued)

FOREIGN PATENT DOCUMENTS

CA 2936983 A1 1/2018
CN 102100623 A 6/2011
(Continued)

*Primary Examiner* — Justin C Mikowski
*Assistant Examiner* — Luke Hall
(74) *Attorney, Agent, or Firm* — Cheng-Ju Chiang

(57) ABSTRACT

Disclosed is a carrying module detachably provided on a host module. The carrying module comprises two mounting bases, two guardrails, two bearing plates, and a backrest assembly. The two guardrails are respectively connected and locked to the mounting bases by means of a first coupling device. The two bearing plates are respectively rotatably mounted at the bottoms of the two guardrails by a second coupling device. When being lifted upwards, the bearing plates are close to the guardrails, and when being horizontally placed, the bearing plates can be used for bearing weight. The backrest assembly is detachably connected and locked to the two guardrails by means of a third coupling device. The host module comprises a host body and a displacement module, which can be combined with a plurality of nursing modules to forma nursing machine, and can also be added with a push module to form a displacement machine.

7 Claims, 11 Drawing Sheets

(51) Int. Cl.

| | |
|---|---|
| ***A61G 5/14*** | (2006.01) |
| ***A61H 3/00*** | (2006.01) |
| ***A61H 3/04*** | (2006.01) |

(52) U.S. Cl.

CPC ......... *A61G 7/1046* (2013.01); *A61G 7/1059* (2013.01); *A61G 7/1063* (2013.01); *A61G 7/1088* (2013.01); *A61G 7/1098* (2013.01); *A61H 3/008* (2013.01); *A61H 3/04* (2013.01); *A61G 5/1002* (2013.01); *A61H 2201/1635* (2013.01); *A61H 2201/164* (2013.01)

(58) Field of Classification Search

CPC .. A61G 7/1063; A61G 7/1088; A61G 7/1098; A61G 5/1002; A61G 5/00; A61G 5/10; A61G 5/12; A61G 5/128; A61H 3/008; A61H 3/04; A61H 2201/1635; A61H 2201/164

USPC ............................................................ 5/86.1

See application file for complete search history.

(56) References Cited

U.S. PATENT DOCUMENTS

| | | | | | |
|---|---|---|---|---|---|
| 5,240,276 | A | * | 8/1993 | Coombs | A61G 5/0891<br>297/42 |
| 5,558,358 | A | * | 9/1996 | Johnson | A61G 5/0891<br>280/87.021 |
| 9,925,105 | B1 | * | 3/2018 | Hines | A61G 7/02 |
| 10,376,734 | B1 | * | 8/2019 | Razon | A61B 5/0077 |
| 10,638,835 | B1 | * | 5/2020 | Short | A47B 23/06 |
| 2013/0061893 | A1 | * | 3/2013 | Nilsson | A61G 5/1091<br>280/647 |
| 2019/0069733 | A1 | * | 3/2019 | Rife | A47K 11/00 |
| 2019/0192374 | A1 | * | 6/2019 | Lass | A61G 5/1002 |
| 2019/0247696 | A1 | * | 8/2019 | Park | A61H 1/0237 |
| 2020/0078257 | A1 | * | 3/2020 | Miller | A61H 3/04 |
| 2020/0146926 | A1 | * | 5/2020 | Liu | A61H 3/04 |
| 2020/0297565 | A1 | * | 9/2020 | McIntosh | A61G 7/1025 |
| 2021/0228433 | A1 | * | 7/2021 | Landry | A61B 5/1117 |
| 2021/0361500 | A1 | * | 11/2021 | Lai | A61G 5/0816 |

FOREIGN PATENT DOCUMENTS

| | | | | | |
|---|---|---|---|---|---|
| CN | 204840050 | U | | 12/2015 | |
| CN | 205094871 | U | | 3/2016 | |
| CN | 208259894 | U | | 12/2018 | |
| CN | 110151498 | A | | 8/2019 | |
| CN | 111067737 | A | | 4/2020 | |
| CN | 111407559 | A | | 7/2020 | |
| CN | 111588556 | A | | 8/2020 | |
| CN | 113041066 | A | * | 6/2021 | A61G 7/14 |
| CN | 113350068 | A | * | 9/2021 | A61G 7/14 |
| CN | 214231861 | U | | 9/2021 | |
| CN | 114555027 | A | | 5/2022 | |
| CN | 216570626 | U | | 5/2022 | |
| CN | 216676228 | U | | 6/2022 | |
| CN | 217091185 | U | | 8/2022 | |
| JP | 2003-180754 | A | | 7/2003 | |
| JP | 2016-159134 | A | | 9/2016 | |
| TW | I638649 | B | | 10/2018 | |
| TW | M583752 | U | | 9/2019 | |
| TW | M622273 | U | | 1/2022 | |
| TW | M622595 | U | | 1/2022 | |
| TW | M622596 | U | | 1/2022 | |
| TW | I791297 | B | | 2/2023 | |
| TW | I791298 | B | | 2/2023 | |
| WO | WO2011147023 | A2 | * | 1/2011 | A61G 5/042 |
| WO | 2018/009545 | A1 | | 1/2018 | |

* cited by examiner

CARRYING MODULE AND AUXILIARY TOOL USING SAME

CROSS REFERENCE TO RELATED APPLICATIONS

The present invention is a 35 U.S.C. § 371 National Phase conversion of International (PCT) Patent Application No. PCT/CN2021/121952, filed on Sep. 29, 2021, the disclosure of which is incorporated by reference herein. The PCT International Patent Application was filed and published in Chinese.

FIELD OF THE INVENTION

The present invention pertains to a medical rehabilitation and health care auxiliary tool, and in particular to a carrying module designed for individuals with varying degrees of disability in diverse scenarios. Besides, the present invention also relates to an auxiliary tool in which the carrying module is combined with a host module, such as a caring machine and a shifting machine.

BACKGROUND OF THE INVENTION

The population of developed countries and some developing nations worldwide is rapidly aging, and the healthcare industry has emerged as one with significant development potential in the future. According to the World Health Organization, the global market size of the elderly industry is projected to reach an output value of US$3.738 billion by 2025.

Aging is frequently associated with functional decline and disability. The nature and extent of daily care, medical rehabilitation, and health care for individuals with disabilities vary, contingent upon the specific type and degree of disability. To aid individuals with limited mobility, healthcare professionals commonly utilize assistive mobility tools, such as hospital beds, wheelchairs, walkers, and similar devices to facilitate movement for those with disabilities.

However, during the care, treatment, rehabilitation, and recovery processes for individuals with disabilities, diverse mobility and rehabilitation needs arise as body functions recover. As a result, each assistive mobility tool plays a specific role in the rehabilitation journey of the disabled. While these tools offer valuable assistance, their usage opportunities are often limited, and they are frequently discontinued after a period due to the improving physical functions of the disabled. Simultaneously, both the disabled individuals and their caregivers often find themselves needing to acquire assistive mobility tools with varying functions. This not only adds financial burden on the disabled, their families, and caregiving institutions but also introduces inconvenience into the realms of medical care and nursing.

For the elderly, infirm, and disabled individuals, lifts play a crucial role in facilitating quick completion of moving and transfer tasks in daily life. Utilizing lifts not only enhances nursing staff efficiency but also reduces the risk of waist and back injuries that may arise during caregiving. Besides, for the elderly, frail, and disabled, regular standing and walking training are essential. Effective training not only diminishes the risk of limb muscle atrophy but also improves walking ability, contributing to the rehabilitation of lower limbs.

While the lifts currently available in the market can generally fulfill the lifting requirements of the elderly, infirm, and disabled individuals, their functionalities are often limited to specific tasks and may not meet the users' daily limb training needs, such as walking or squatting to maintain muscle strength and overall health. Additionally, these lifts may prove inconvenient when engaged in other fundamental life activities, such as cleaning or using the toilet.

Therefore, it is crucial to develop a multi-purposed shifting machine capable of addressing the daily life activities and basic rehabilitation training needs of individuals with disabilities. Integrating this shifting machine with a multimodal caring module has become a challenge that experts in the field are actively seeking to resolve. Such a shifting machine should be adaptable for carrying the load-bearing module of the disabled or rehabilitated, and it should help users at different levels for various rehabilitation exercises. This facilitates a smooth transition for both the disabled and caregivers, from the initial stages of illness to the recovery process. This approach not only benefits a wide range of people by enhancing usability and functionality but also alleviates the economic burden on users and minimizes environmental resource wastage.

SUMMARY OF THE INVENTION

The objective of the present invention is to provide a carrying module and an auxiliary tool system utilizing a caring machine and a lift. The carrying module, when installed on a host module, can be deployed outward and left or closed inward. The shifting machine comprises both the carrying module and the host module, and these two modules collaborate to offer users multiple functions, including riding, shifting, and moving.

To achieve at least one of the aforementioned advantages or other benefits, an embodiment of the present invention provides a carrying module that is detachably installed on a host module. The carrying module comprises at least two attachment bases, directly or indirectly installed on the host module. Two guardrails are rotatably connected and locked to the attachment bases through a first coupling device. Additionally, two load-bearing plates are respectively rotatably installed at the bottom of the guardrails through a second coupling device. When the load-bearing plates are lifted upward, the load-bearing plate closely aligns with the guardrails, and when placed horizontally, the load-bearing plates can be used to carry a load. The backrest assembly is connected to the two guardrails through a third coupling device, enabling consistent positioning of the guardrails in terms of up and down, front and rear positions.

Each of the first coupling devices comprises a pivot device that connects the attachment base and the guardrails, enabling the guardrails to rotate horizontally around the attachment base. A self-locking positioning device is installed on both the attachment base and the guardrails. When the guardrails pivot to a specific position relative to the attachment base, the self-locking positioning device automatically locks the guardrails in place.

The pivot device comprises a pivot hole and a rotating shaft on the attachment base. The pivot hole is positioned at one end of the guardrails, designed to be sleeved onto the rotating shaft of the attachment base. The self-locking device comprises at least one positioning hole and at least one positioning pin, arranged respectively and correspondingly on the attachment base. When the guardrails are closed or in a specific orientation, the positioning pins installed on either the attachment base or guardrails automatically engage with the positioning holes on the guardrails or attachment base, thereby limiting the horizontal rotation of the guardrails.

The load-bearing plate is positioned below or at the bottom of the guardrails and is detachably mounted through a second coupling device. Each second coupling device comprises a rotating shaft rod and a pivot groove. The rotating shaft rod is installed at the bottom of the guardrails and is equipped with multiple limit pins. The pivot groove is disposed on one side of the load-bearing plate, forming a U-shaped groove sleeved onto the rotating shaft rod. The pivot groove comprises several long holes, designed to accommodate the limit pins, allowing the load-bearing plate to be positioned horizontally for carrying loads and lifted upward to approach or move away from the guardrails. In addition, each second coupling device further comprises a positioning device installed on the guardrails to prevent the load-bearing plates from falling during use so as to ensure uninterrupted use of the guardrails.

Each load-bearing plate features an arc-shaped notch. When the two load-bearing plates are laid flat and closed, their respective arc-shaped notches face each other so that an opening is formed. In this configuration, users can utilize the two load-bearing plates for riding.

The backrest assembly comprises at least one seatback base and at least one seatback. The seatback base is connected to at least one of the two guardrails through a third coupling device, and the seatback is detachably coupled to the seatback base. The third coupling device comprises at least one pivot-mounted locking device installed on the coupling end of the seatback base and the guardrails so that the seatback base may rotate horizontally around the guardrails and may be locked in a specific orientation.

In one embodiment, the backrest assembly comprises two seatback bases, each coupled with one of the two guardrails. The third coupling device further comprises two pivot-mounted locking devices and a locking device. The pivot-mounted locking devices are installed on the coupling end of each seatback base and the corresponding guardrails, allowing the seatback bases to rotate horizontally around the guardrails and be locked at specific orientations. The locking device is installed on the other side of the seatback bases. Consequently, when the seatback bases are closed, both seatback bases are securely locked.

The backrest assembly comprises a seatback base and a seatback. The third coupling device is defined as two pivot-mounted locking devices, each installed on both sides of the seatback base. Each pivot-mounted locking device consists of a pivot pipe sleeve pivotally coupled to the guardrails through a positioning groove. A hook locking member is installed on the seatback base, capable of connecting and locking with the positioning groove on the pivot pipe sleeve, thereby maintaining consistent up and down, front and rear positions of the two guardrails. When only one side of the hook locking member on the seatback base is engaged with the pivot pipe sleeve, the seatback base and the pivot pipe sleeve can rotate at any angle.

The host module consists of a host body, on which two attachment bases are installed. Besides, there is a shifting module that comprises a chassis unit and a wheel caster set. The wheel caster set is pivotally connected to the side end of the chassis unit, which also consists of a pedal. The host body is mounted on the chassis unit.

The present invention also provides a caring machine capable of being combined with various caring modules to offer diverse care functions. The caring machine comprises, at least, the aforementioned carrying module and host module. The chassis unit comprises a chassis body and pedals installed above the chassis body. The chassis body also comprises a guide track, allowing the pedals to be moved along the guide track.

In one embodiment, the host body of the host module is a supporting frame module comprising multiple upright poles and connecting plates. One end of each upright pole is attached and fixed to the chassis unit, while the other end is connected and fixed below the connecting plates. The carrying module is mounted on one of the upright poles with specific heights through two fourth coupling devices.

The caring machine also comprises a push module installed on the support frame module and responsible for controlling the movement of the host module. Besides, a top support module is installed on the support frame module and comprises a top support seat frame and a top support member. The top support member is affixed to the upper support frame and is intended to offer assistance for the torso of individuals with disabilities.

Each of the fourth coupling devices comprises a height adjustment device and multiple lock holes arranged along the upright direction of the upright pole. The height adjustment device is installed on the attachment base, and a sliding sleeve provided on the upright pole is secured by locking it into the upright pole through the lock holes.

In order to achieve at least one of the aforementioned advantages or other benefits, another embodiment of the present invention provides a shifting machine which comprises at least a carrying module and a host module. The carrying module further includes an attachment arm, and the attachment bases installed at both ends of the attachment arm. The carrying module is mounted on the host module through the attachment arm.

The host body of the host module is a column module, and consists of a fixed bracket and a lifting bracket. The lifting bracket is positioned above the fixed bracket and is capable of moving up and down in the upright direction. The carrying module is mounted at one of multiple specific height positions through the fourth coupling devices.

The chassis unit has a flat upper surface that functions as a pedal and is connected to the fixed bracket.

The shifting machine further includes a driving module installed on the chassis unit to facilitate the movement of the lifting bracket up and down in the upright direction. In addition, a push module is installed on one side of the column module for pushing or pulling the lift.

As for the aforementioned carrying module and host module, the carrying module is installed on the host module, which comprises at least a column module, a shifting module, and a driving module.

The fourth coupling device comprises a coupling interface with multiple coupling points arranged on the lifting bracket in an upright direction. Besides, a coupling module is connected to one of the plurality of coupling points on the coupling interface of the lifting bracket, and it is coupled with the attachment arm through a fifth coupling device.

The fifth coupling device comprises a coupling port and a coupling structure. The coupling port is located on the coupling module and provides a horizontal plane extending from one side of the coupling module. It includes multiple positioning holes on the horizontal plane, as well as positioning grooves on both sides of the horizontal plane. In addition, the coupling port further includes a vertical plane which is perpendicular to the horizontal plane and equipped with an installation keyhole. The coupling structure is installed at the center of the attachment arm and is configured to match the layout of the coupling port. Furthermore, the coupling structure is secured onto the coupling port of the coupling module through a quick-locking member.

The lifting bracket is positioned above the fixed bracket and has the capability to move up and down along the upright direction. The lifting bracket is equipped with multiple keyholes in the vertical direction, allowing the carrying module to be installed at any height on the column module through these keyholes. The shifting module comprises at least one chassis unit and a wheel caster set. The rolling legs are pivotally connected to both ends of the chassis unit, and the wheel caster set can open and close, facilitating the movement of the host module. The chassis unit includes a flat upper surface and is connected to the fixed bracket to support the column module. The driving module is installed on the chassis unit to operate the lifting bracket, moving it up and down along the fixed bracket in the upright direction.

The driving module comprises a motor, transmission components, and control components. In one embodiment, the chassis unit is entirely configured as a box shape and is used to house the motor and associated control components. The transmission components extend from the chassis unit into the column module. The motor drives the transmission components so as to operate to raise or lower the lifting bracket in the vertical direction along the fixed bracket.

In one embodiment, the coupling module comprises a main body, a control member, and a positioning member. The main body of the coupling module is a hollow square frame with a through hole, allowing it to be inserted into the column module. The control member and positioning member are installed on different sides of the main body. The main body can be moved and locked on the column module through the control member and the positioning member so that the coupling module will be secured onto the column module. Additionally, the coupling module can be locked onto the column module using a fastener and a mounting hole on the main body, enhancing the stability of the coupling module on the column module.

The shifting machine may include a top support module installed on the shifting module of the host module. Specifically, the top support module is mounted on the chassis unit of the shifting module. Additionally, the top support module can be installed on the column module through the coupling device. The top support module is adjustable and allowed for upward, downward, forward, or backward adjustments based on usage conditions. The top support module comprises a top support seat frame, which is installed on the chassis unit or the column module. Moreover, a top support member is attached to the top support seat frame and serves the purpose of receiving and supporting.

The shifting machine may include a pedal module, installed on one side of the chassis unit of the host module, which can be folded toward the chassis unit. The pedal module comprises a fixed base installed on one side of the chassis unit, and a pivot plate pivoted to the fixed base can be folded toward the chassis unit. Besides, the pedal module further includes a pedal, which is secured to the pivot plate through a quick-locking member.

The shifting machine may also feature a handle installed on one side of the column module of the host module. Caregivers can utilize the handle to push or pull the lift, facilitating the movement of the elderly, weak, sick, or disabled individuals, or assisting the disabled in rehabilitation exercises.

Therefore, the present invention provides a carrying module and an auxiliary tool system, such as a lift/caring machine, utilizing the carrying module and its installed different functional modules. The present invention is designed for people with disabilities and offers various care functions, including but not limited to riding, assisting walking, using the toilet, assisting standing, etc., for the disabled. Different care functions can be customized based on user needs, allowing a single machine to serve multiple purposes. There is no need to replace different types of lifts each time different care functions are required, thus saving the user's care costs.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

Figure 1:
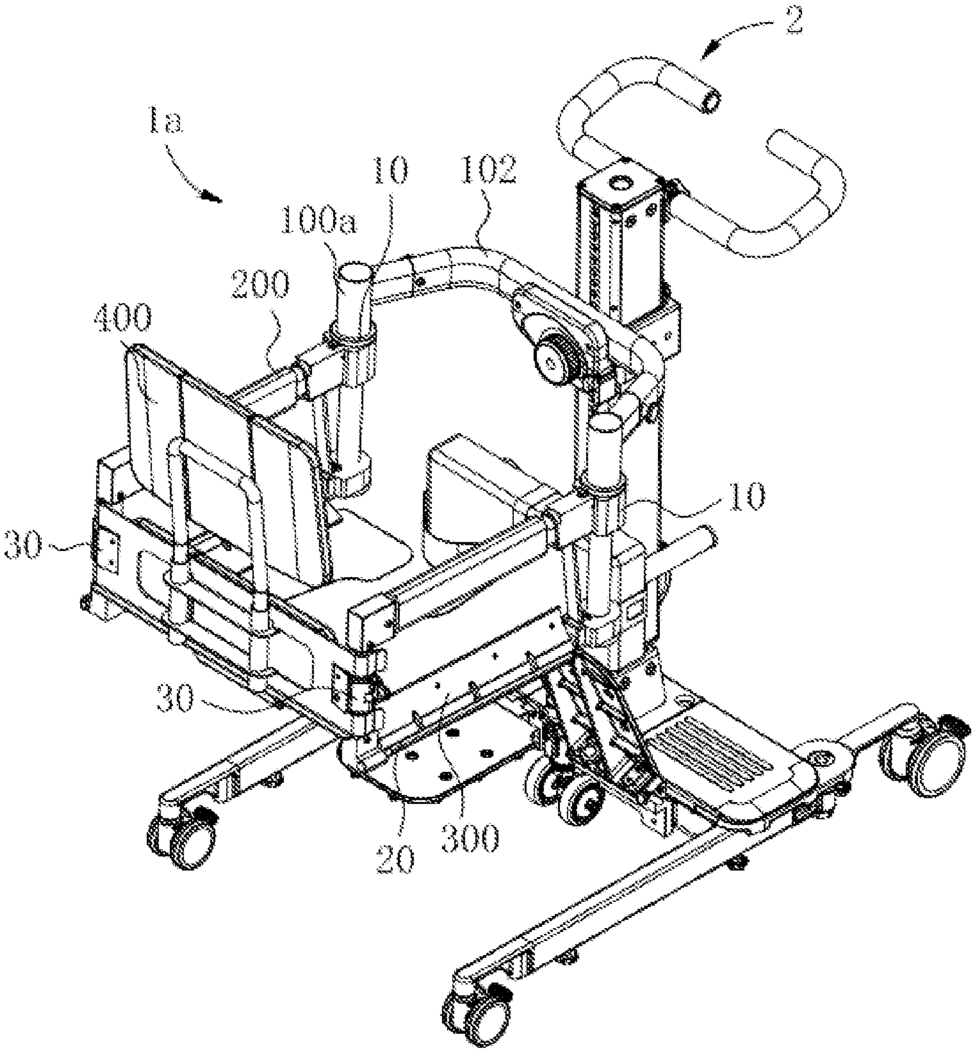
FIG. 1 is a schematic three-dimensional view of an embodiment of a carrying module of the present invention.

Notations in Drawings: carrying module 1, 1*a*0, 1*b*; attachment bases 100, 100*a*, 100*b*; pivot device 12, pivot hole 121, self-locking positioning device 14, positioning hole 141, positioning pin 142, release button 143, push module 150, 150*a*; second coupling device 20, third coupling device 30, 30*a*, 30*b*; pivot-mounted locking devices 31*a*, 31*b*; locking device 32*a*, 32*b*; pivot-mounted locking device 33, pivot sleeve 34, positioning groove 341, hook locking member 35, locking member 36, long rods 210, 201*a*; shaft rod 211, 211*a*; pivot groove 22, 22*a*; elongated holes 23, limiting pins 24, positioning device 25, 25*a*; long groove 28, assembly members 212, 213, 214, 215, connecting rod 216, connecting rod 217, backrest assembly 400,

400*a*, 400*b*; seatback base 402, 402*a*, 402*b*; seatback 404, 404*a*, 404*b*; flat plate 408, arc-shaped notches 310, opening 312, host module 2, 2*a*, caring machine 3, shifting machine 4, host body (column module) 500, shifting module 600, driving module 700, fixed bracket 510, lifting bracket 520, coupling module 522, coupling interface 524, lock holes 5241, chassis unit 610, chassis body 611,611*a*; guide rail 613, wheel caster set 620, pedal 612, 612*a*; long legs 621, universal wheel caster sets 622, short legs 623, directional wheel caster set 624, pivot shaft 625, switching device 626, directional wheel 627, elastic device 628, top support module 800,800*a*; supporting frame 810, 810*a*; supporting member 820, pedal module 630, fixed base 631, pivot plate 632, pedal 633, quick locking assembly 635, host body 900 (host body), upright poles 910, lock holes 911, connecting plates 920, fourth coupling devices 40, 40*a*; height adjustment device 41, main body 420, mounting hole 422, first coupling interface 424, second coupling interface 425, third coupling interface 426, fourth coupling interface 427, connecting member 4240, control member 430, handle 431, connecting rod 432, push-pull rod 433, fixed base 434, positioning member 440, fixed block 441, a sliding block 442, positioning pin seats 443, positioning pins 444, mounting holes 445, fifth coupling device 50, coupling port 51, horizontal surface 511, positioning holes 513, positioning grooves 515, vertical surface 517, mounting lock hole 519, coupling structure 53, quick-locking member 55

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

Figure 2:
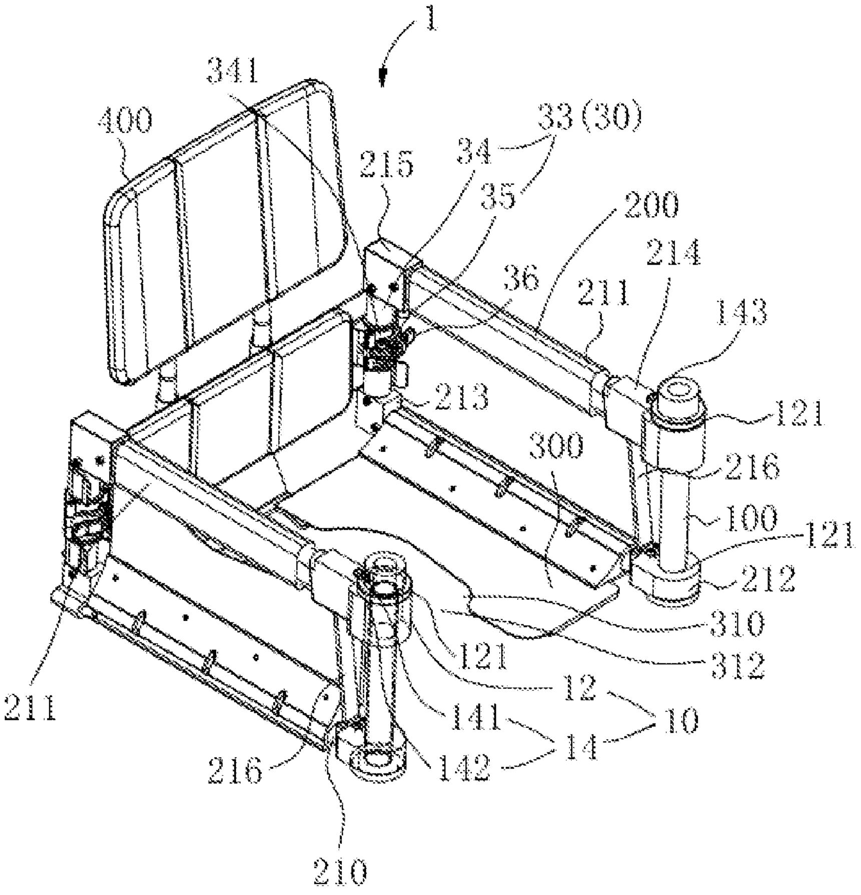
FIG. 2 is a three-dimensional perspective view of the carrying module as shown in FIG. 1 from another perspective.
Figure 3:
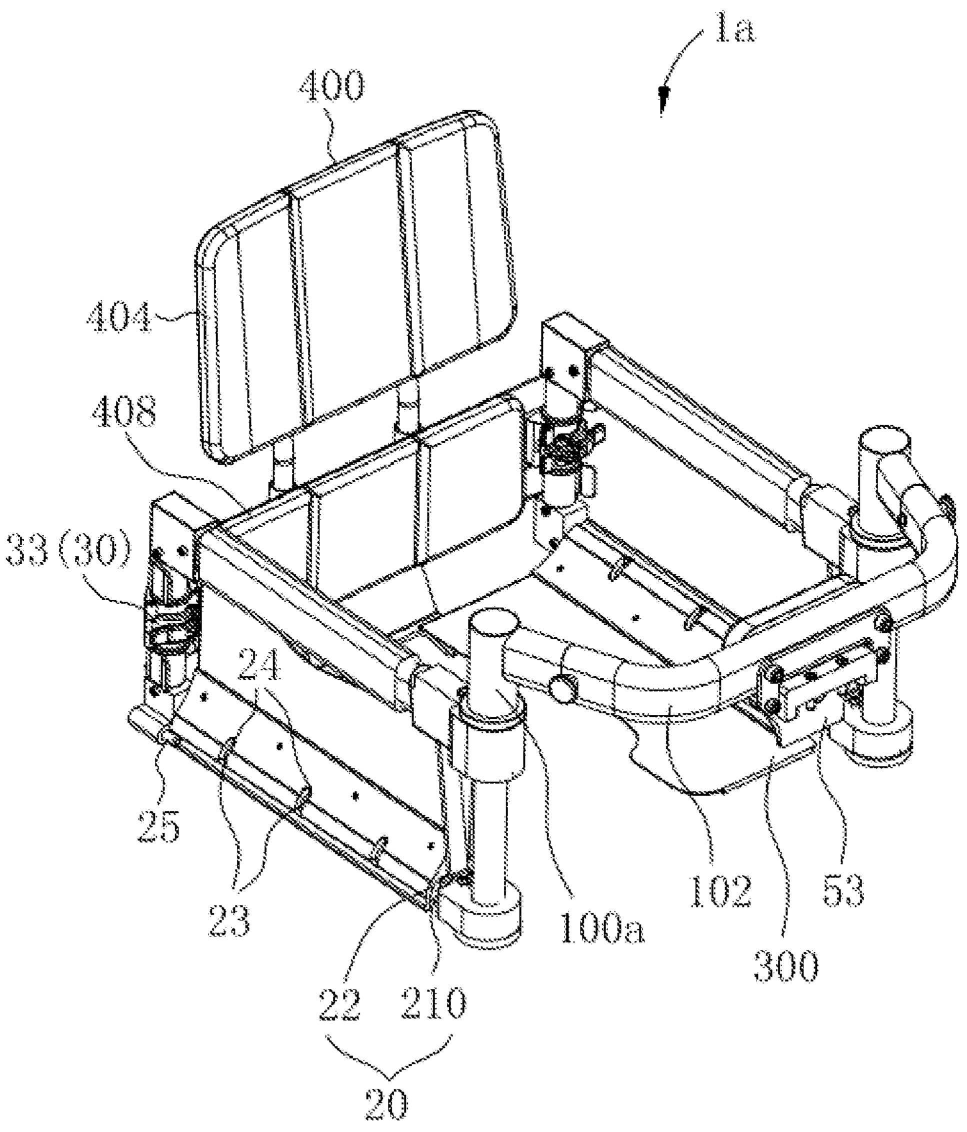
FIG. 3 is a perspective view of the carrying module as shown in FIG. 1 from another perspective.

Please refer to FIGS. 1 to 3A. FIG. 1 depicts a schematic three-dimensional view of an embodiment of a carrying module of the present invention. FIGS. 2 and 3 illustrate schematic perspective views of the carrying module, as shown in FIG. 1, from different perspectives. As depicted in FIG. 1, to achieve at least one of the above advantages or other benefits, an embodiment of the present invention provides a detachable carrying module 1 installed on a host module 2.

Referring to FIG. 2, the carrying module 1 comprises at least two attachment bases 100, two guardrails 200, two load-bearing plates 300, and a backrest assembly 400. Depending on the functions or usage requirements of the carrying module 1, the attachment bases 100 can be installed and secured at different positions or heights on the host module 2. The two guardrails 200 are connected and locked with the two attachment bases 100 through a first coupling device 10 respectively, and the two guardrails 200 can rotate horizontally around the attachment bases 100 to expand outward, left, right, or close inward. The two load-bearing plates 300 are each rotatably mounted on the bottoms of the two guardrails 200 through a second coupling device 20 respectively. When the load-bearing plates 300 are lifted upward, they can be brought close to the guardrails 200, enhancing the versatility of the carrying module 1 for functions beyond user transportation. To prevent the load-bearing plates 300 from falling and impacting the use of the guardrails 200, a positioning device 25 such as a hook (shown in FIG. 3) may be employed to secure the position of the load-bearing plates 300. While the load-bearing plates 300 are in horizontal position, the load-bearing plates 300 can carry weight, providing a ride platform for individuals. When the load-bearing plates 300 are not in use, the load-bearing plates 300 can be swiftly detached after being lifted, allowing the carrying module 1 to adapt for various functions beyond riding. The backrest assembly 400 is connected and locked with the two guardrails 200 through a third coupling device 30 and serves to support and protect the user. When the backrest assembly 400 is coupled to the two guardrails 200, the third coupling device 30 ensures the up-and-down, front-and-rear positions of the two guardrails 200 remain consistent.

As illustrated in FIG. 2, each of the guardrails 200 comprises at least two long rods 210, 211. The long rods 210, 211 extend in parallel both upward and downward and are equipped with assembly members 212, 213, 214, 215 at their respective ends. The long rods 210 and 211 are arranged in parallel, connected, and installed through a series of connecting rods or equivalent structures. There is a specific distance maintained between the two long rods 210 and 211. In the embodiment depicted in FIGS. 1 and 2, the assembly members 212 and 214 are connected by the connecting rod 216. The assembly members 213 and 215 are located at both ends of the third coupling device 30, connected by a connecting rod 217 (not shown here, please refer to FIGS. 4 and 5), which is enclosed within the third coupling device 30. Consequently, the attachment and fixation of these components result in the alignment of the two long rods 210 and 211 within the same plane.

The first coupling device 10 comprises a pivot device 12 and a self-locking positioning device 14. The pivot device 12 establishes a connection between the attachment bases 100 and the guardrails 200 allowing the guardrails 200 to rotate horizontally around the attachment bases 100. The self-locking positioning device 14 is disposed on both the attachment bases 100 and the guardrails 200. Each guardrail 200 automatically locks when the guardrail 200 pivots to a specific position relative to the attachment bases 100 (such as when the two guardrails 200 align parallel to each other). It's important to note that the attachment bases 100 shown in FIG. 2 represent a general schematic diagram, while the attachment bases 100*a* shown in FIG. 1 are specifically designed for installation onto the host module 2. There is a notable distinction between these two forms of attachment bases. The present invention provides different attachment bases tailored for specific uses depending on the host module 2 employed.

In FIGS. 2 and 3, the pivot device 12 consists of a pivot hole 121 and a rotating shaft situated on the attachment bases 100. The pivot hole 121 is located at one end of the guardrails 200 (such as specifically on the assembly members 212 and 214), and is used to receive the rotating shaft of the attachment bases 100. The self-locking positioning device 14 is provided with at least one positioning hole 141 and one positioning pin 142, correspondingly and respectively positioned on the attachment bases 100 and the guardrails 200. When the guardrails 200 are either closed or in a specific orientation, the positioning pins 142 on the attachment bases 100 or the guardrails 200 automatically secure into the corresponding positioning holes 141 on the guardrails 200 or attachment bases 100 to restrict the horizontal rotation of the guardrail 200. In the embodiment of FIG. 2, the positioning holes 141 are disposed on the attachment bases 100, while the positioning pins 142 are positioned on the assembly members 214. When the two guardrails are swiveled to parallel positions, the positioning pins 142 and the positioning holes 141 automatically lock to maintain the two guardrails 200 parallel to each other, creating a comfortable and stable riding space for users. When the guardrails 200 are not in use and the users wishes to reposition the guardrails 200, they can simply press the release button 143, which is situated on the assembly member 214 and connected to the positioning pin 142. It causes the positioning pin 142 to disengage from the positioning hole 141, releasing the self-locking position.

Furthermore, the self-locking positioning device 14 is used to restrict the two guardrails 200 from unfolding outward, to the left, or to the right. When the guardrails 200 are securely connected to the attachment bases 100, locked, and closed inward to a specific position, the self-locking device 14 engages, effectively restricting any outward, left, or right movement of the guardrails 200. Thus, it ensures the safety of the user by preventing any unintended unfolding that could potentially pose a risk.

Figure 3A:
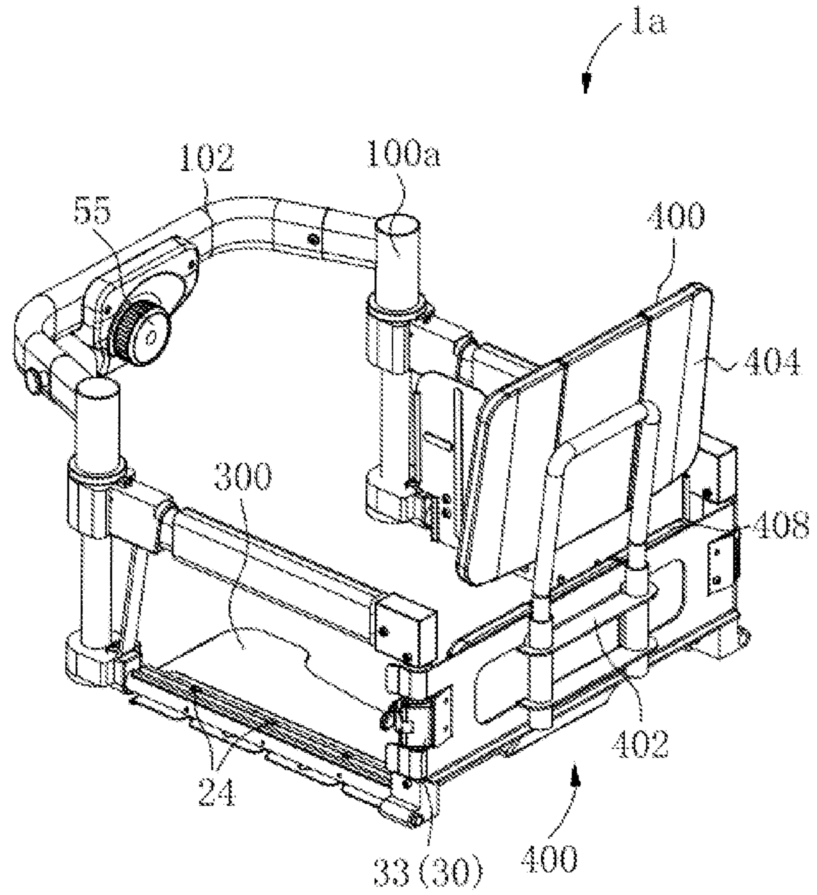
FIG. 3A is a perspective view of the carrying module as shown in FIG. 1 from a still another perspective.

Referring to FIGS. 3 and 3A, as well as FIGS. 1 and 2, the load-bearing plates 300 are affixed in a detachable manner to the bottom of the guardrails 200 through the second coupling device 20. It has the capability to rotate relative to its adjacent long rod 210. In this embodiment, the long rod 210 serves as the rotating shaft rod for the load-bearing plates 300. The second coupling device 20 consists of a rotating shaft rod 210 and a pivot groove 22. The rotating shaft rod 210 is provided at the bottom of the guardrails 200 and is equipped with multiple limiting pins 24. The pivot groove 22 is positioned on one side of the load-bearing plates 300, and can be in the form of a U-shaped groove which is used to accommodate the rotating shaft rod 210. Multiple elongated holes 23 are disposed at the pivot groove 22, and are used to house the limiting pins 24. It provides the load-bearing plate 300 with flexibility to be positioned horizontally for load-bearing purposes, and provides the option for the load-bearing plate 300 to be lifted upward, either in proximity to or away from the guardrails 200. Each of the second coupling devices 20 further includes an additional positioning device, which is mounted on the guardrails 200. The positioning pin 25, as illustrated in FIG. 3, is used to secure the load-bearing plates 300 during use, preventing any unintended falls that might interfere with the proper functioning of the guardrails 200. When the load-bearing plate 300 is rotated upward and in close proximity to the guardrail 200, the pivot groove 22 rotates around the long rod 210 and can be fixed by using the positioning pin 25 or other positioning device when it is close to the guardrails 200. It's noted that each of the load-bearing plates 300 has an arc-shaped notch 310. When the two load-bearing plates 300 are laid flat and closed, these two arc-shaped notches

310 face each other, creating an opening 312. Thus, the two load-bearing plates 300 become suitable for carrying the user. It means that the carrying module 1 can serve as a platform for the user to ride on. Besides, when the two load-bearing plates 300 are laid flat and closed, the opening 312 formed corresponds to the size of a toilet seat cavity. It allows users with disabilities to utilize the toilet comfortably.

Figure 3B:
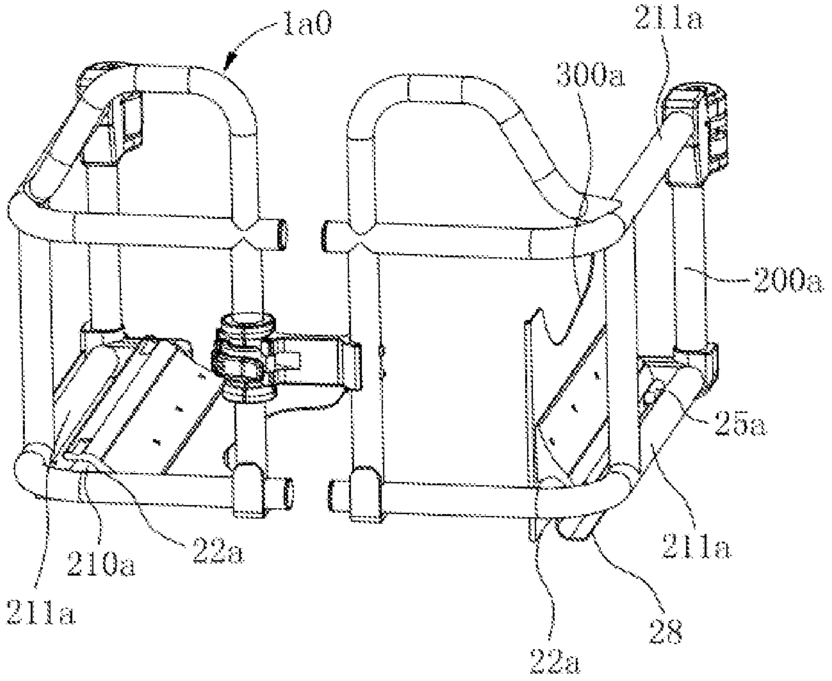
FIG. 3B is a schematic three-dimensional view of another embodiment of the second coupling device of the carrying module according to the present invention.

In addition to utilizing the lower long rod 210 of the guardrail 200 as the rotational axis for the load-bearing plate 300, an alternative rotating shaft 210*a* can also be introduced. Referring to FIG. 3B, the carrying module 1*a* features two guardrails 200*a*, and each of the guardrails 200*a* further comprises a rotating shaft 210*a* in addition to two parallel upper and lower long rods 211*a*. The rotating shaft 210*a* is positioned at the bottom of the guardrail 200*a* and is parallel to the lower long rods 211*a*. One side of each load-bearing plate 300*a* is furnished with a U-shaped pivot groove 22*a*, and a long groove 28 is situated at a distance from the side of the pivot groove 22*a*. The opening of the long groove 28 corresponds to the opening of the pivot groove 22*a*. The load-bearing plate 300*a* is used to receive the rotating shaft 210*a* through the pivot groove 22*a*. When the load-bearing plate 300*a* is positioned horizontally, the long groove 28 securely accommodates the lower long rod 211*a* for carrying user's weight. Upon lifting the load-bearing plate 300*a* upward, the pivot groove 22*a* rotates around the rotating shaft 210*a* and is secured by the positioning device (positioning pin) 25*a* when it approaches the guardrail 200*a*.

Please continue to refer to FIGS. 3 and 3A, as well as refer to FIGS. 1 and 2. The backrest assembly 400 comprises at least one seatback base 402 and at least one seatback 404. The seatback base 402 is connected to one of the two guardrails 200 through the third coupling device 30, and the seatback 404 is detachably coupled to the seatback base 402. The third coupling device 30 includes at least one pivot-mounted locking device 33, installed on the coupling end of the seatback base 402 and the guardrail 200, allowing the seatback base 402 to rotate around the guardrail 200 in the horizontal direction. The seatback base 402 further consists of a flat plate 408 for cushioning to enhance the comfort of the ride.

Figure 4:
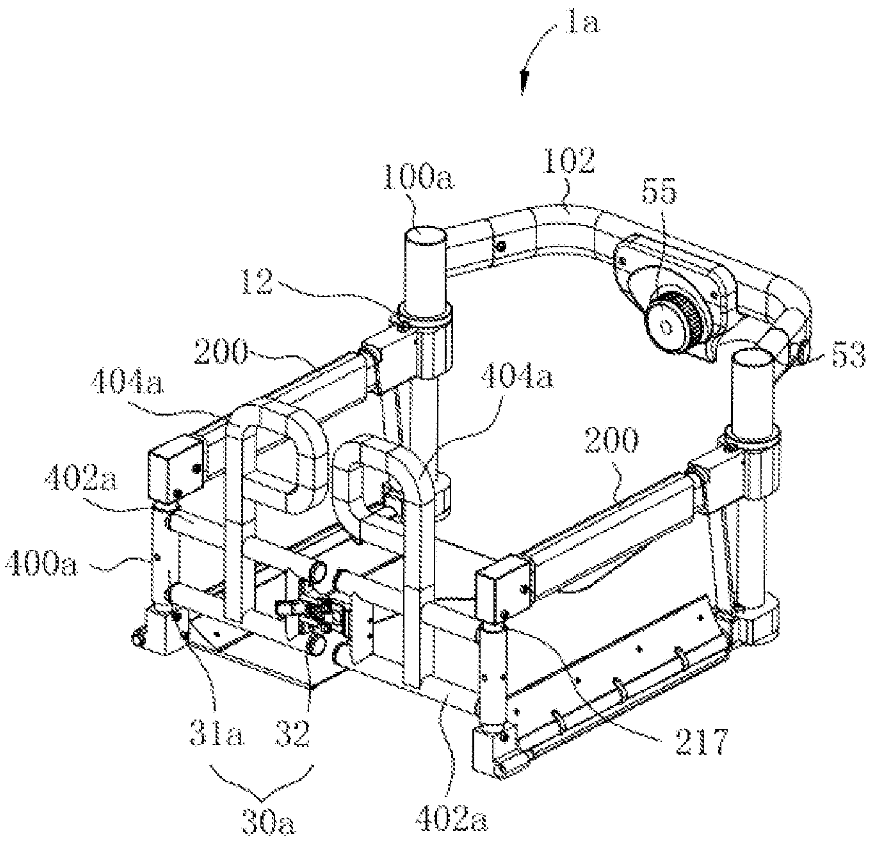
FIG. 4 is a schematic three-dimensional view of one embodiment of the backrest assembly according to the present invention.
Figure 5:
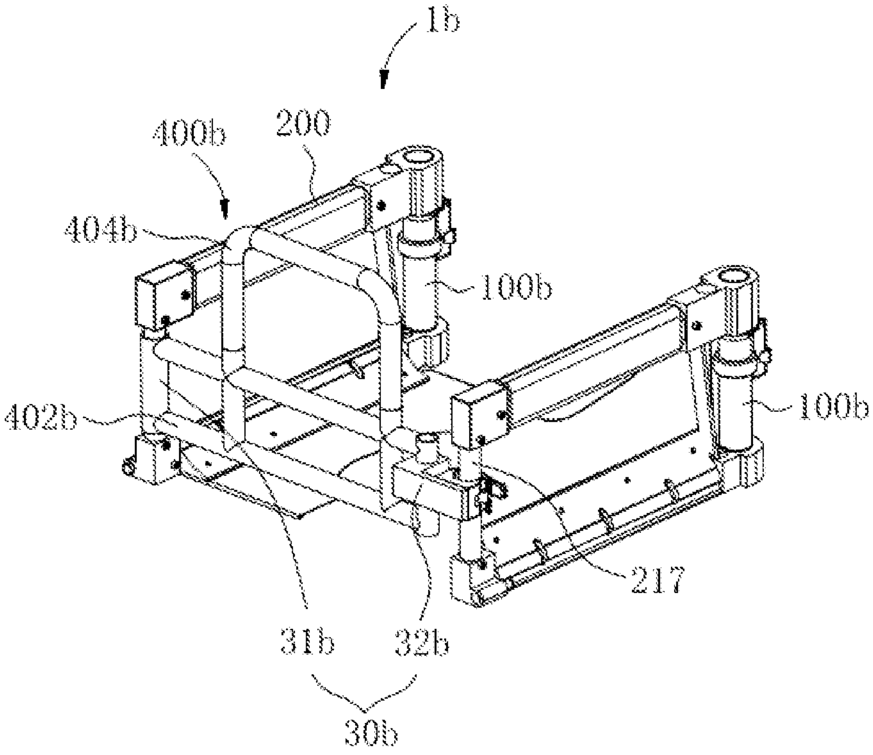
FIG. 5 is a schematic three-dimensional view of another embodiment of the backrest assembly according to the present invention.

In another embodiment, as depicted in FIG. 4, the backrest assembly 400*a* of the carrying module 1*a* includes two seatback bases 402*a*, each respectively coupled with one of the two guardrails 200, and two seatbacks 404*a*, each detachably coupled to its respective seatback base 402*a*. The third coupling device 30*a* further comprises two pivot-mounted locking devices 31*a* and a locking device 32. The pivot-mounted locking devices 31*a* are installed on the coupling end of the seatback base 402*a* and the guardrail 200, allowing the two seatback bases 402*a* to respectively rotate in the horizontal direction around their respective coupled guardrail 200 and can be locked in a specific orientation. The locking device 32 is installed on the other side of the seatback bases 402*a* so that the two seatback bases 402*a* are locked when they are closed.

In addition to the embodiment of a dual-seatback assembly illustrated in FIG. 4, where the backrest assembly expands outward, closes inward, and locks in the middle, an alternative embodiment of the backrest assembly can include a single seatback base. In this embodiment, one end of the seatback base is pivotally connected to one guardrail, while the other end is lockably coupled to another guardrail. In another embodiment, depicted in FIG. 5, the backrest assembly 400*b* of the carrying module 1*b* includes a seatback base 402*b* and a seat back 404*b*. The third coupling device 30*b* further comprises a pivot lock device 31*b* and a locking device 32*b*. The pivot-mounted locking device 31*b* is installed on the coupling end of one of the guardrails 200 and the seatback base 402*b*, allowing the seatback base 402*b* to rotate horizontally around the guardrail 200 and be locked in a specific orientation. The locking device 32*b* is installed on the other side of the seatback base 402*b*, locking it to another guardrail, while the seat back 404*b* is detachably coupled to the seatback base 402*b*. However, due to this unilateral coupling method, users can only unlock the side where the locking device 32*b* is located, restricting the pivoting operation of the seatback base 402*b*. If the locking device 32*b* is installed on the right side of the seatback base 402*b*, it may be inconvenient for left-handed users to lock or unlock the device, as the user's dominant hand may be in a different direction.

To address the previously mentioned issue, please refer back to the carrying modules 1 and 1*a* in FIGS. 2 and 3. The third coupling device 30 is defined as two pivot-mounted locking devices 33, installed on both sides of the seatback base 404. Each of the pivot-mounted locking device 33 comprises a pivot sleeve 34 and a hook locking member 35. The pivot sleeve 34 is pivotally connected to one end of a guardrail 200. For example, the pivot sleeve 34 is typically linked to the connecting rod 217 (not shown in FIGS. 2 and 3, refer to FIGS. 4 and 5) between the two sets of joints 213, 215 on the two parallel long rods 210, 211 of the guardrail 200. The pivot sleeve 34 includes a positioning groove 341. The hook locking member 35 is a hook lock structure, and is attached to one end of the seatback base 404. The hook locking member 35 has a locking member 36 (see FIG. 2) at the other end. Moreover, the hook lock member 35 can interlock with and secure the positioning groove 341 on the pivot sleeve 34 so that it ensures that the two guardrails 200 maintain consistent positions both vertically and horizontally. When only one side of the hook locking member 35 on the seatback base 404 is engaged with the pivot sleeve 34, the seatback base 404 and the pivot sleeve 34 can freely rotate at any angle. Users have the flexibility to open the pivot-mounted locking device 33 on either the left or right side of the seatback base 404, regardless of whether they are left-handed or right-handed. It allows users to select the side that is most convenient for them to unlock. The seatback base 404 and the pivot sleeve 34 can then rotate at any angle by utilizing the hook locking member 35 on the side not engaged and locked with the pivot sleeve 34. If the backrest assembly 400 is not required, both pivot-mounted locking devices 33 can be easily unlocked and removed.

Figure 6:
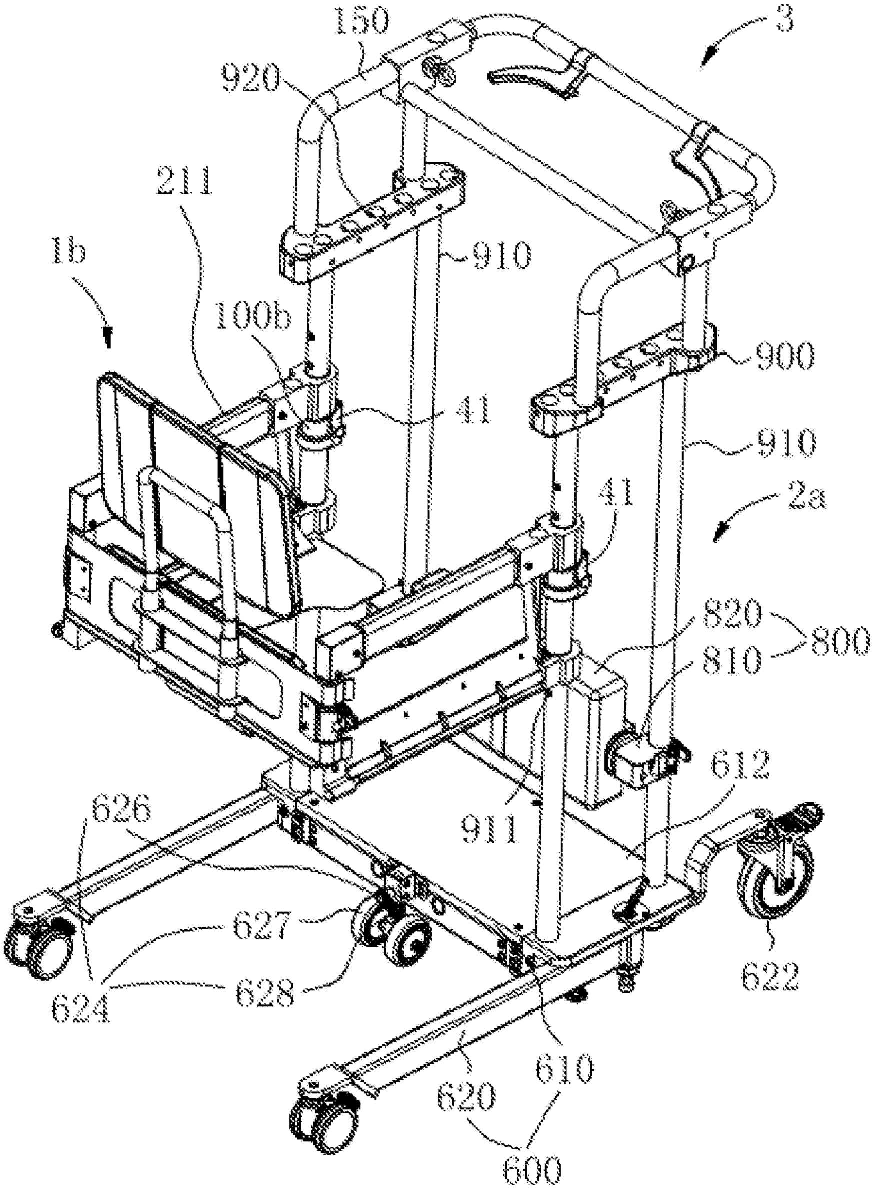
FIG. 6 is a schematic three-dimensional view of one embodiment of a caring machine according to the present invention.
Figure 7:
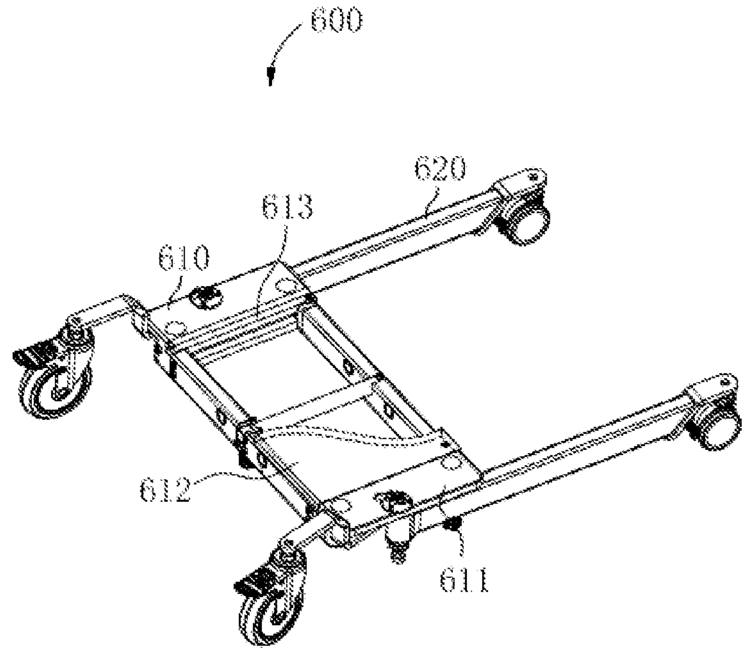
FIG. 7 is a schematic three-dimensional view of one embodiment of a shifting module according to the present invention.

Please refer to FIGS. 6 and 7 in conjunction with FIGS. 1 to 3. FIG. 6 provides a schematic three-dimensional perspective view of an embodiment of the caring machine in the present invention, while FIG. 7 illustrates a schematic three-dimensional perspective view of an embodiment of the chassis unit of the caring machine as shown in FIG. 6. As depicted in FIGS. 6 and 7, to achieve at least one of the aforementioned advantages or other benefits, another embodiment of the present invention introduces a caring machine 3. The caring machine 3 comprises at least a carrying module 1, as previously described, and a host module 2, with the carrying module 1 is installed on the host module 2. The carrying module 1 offers various care functions, and the host module 2 is designed to be mobile.

The carrying module 1 is versatile and can be mounted on different host modules featuring distinct attachment bases. For example, the host module 2 depicted in FIGS. 1 and 8, as well as the host module 2*a* in FIG. 6. Both the host module 2 and 2*a* are equipped with the carrying modules 1*a* or 1*b*, and consist of a host body 500 or 900, a shifting module 600*a*/600, and a push module 150*a*/150. The attachment bases 100*a*/100*b* of the carrying module 1*a*/1*b* are affixed to the host body 500 or 900. The shifting module 600*a*/600 comprises a chassis unit 610 and a wheel caster set 620. The wheel caster set 620 is pivotally attached to the side end of the chassis unit 610. The chassis unit 610 comprises a chassis body 611*a*/611 and a pedal module 630, or a pedal 612*a*/612, with the host body 500 or 900 installed on the chassis unit 610. Besides, the host module 2 or 2*a* may further comprise a backrest module 800*a*/800.

Figure 8:
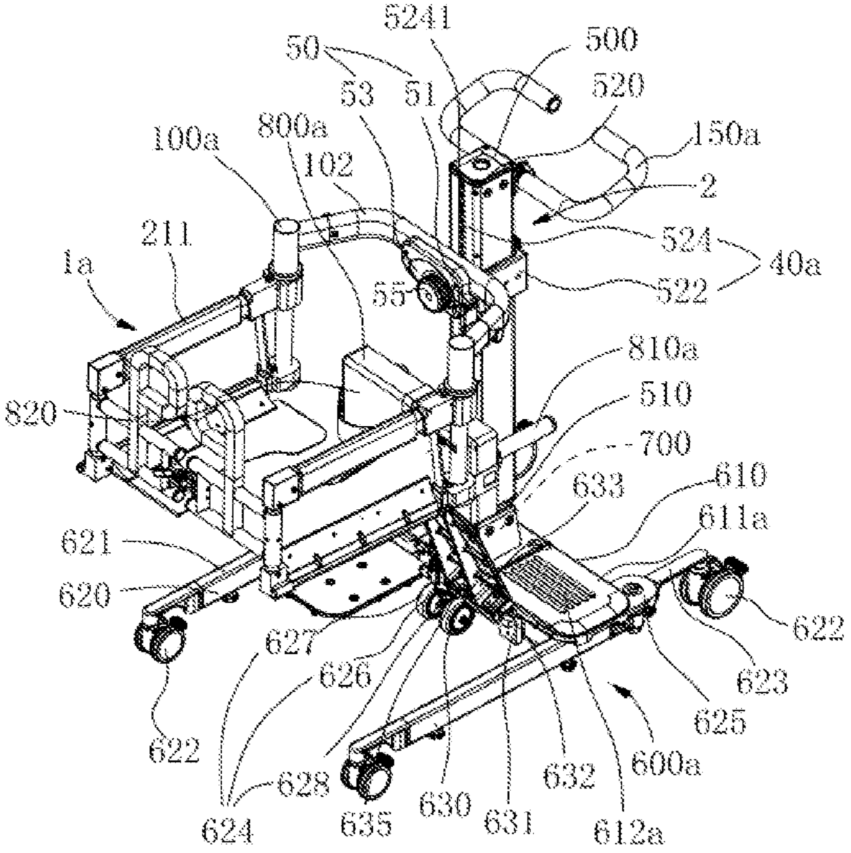
FIG. 8 is a schematic three-dimensional view of one embodiment of a shifting machine according to the present invention.

Referring to FIGS. 6 and 8, the wheel caster set 620 comprises multiple universal wheel caster sets 622 and at least one directional wheel caster set 624. The directional wheel caster set 624 includes a directional wheel 627, an elastic device 628, and a switching device 626. The elastic device 628 ensures continuous contact between the directional wheel 627 and the ground, while the switching device 626 provides control over the directional wheel 627, allowing it to be oriented in a specific direction or to be freely turned.

Referring to FIG. 6, the top support module 800 is mounted on the host body 900. The top support module 800 comprises a supporting frame 810 and a supporting member 820. The supporting member 820 is installed to the supporting frame 810 and is designed to provide support for the body torso.

Referring to FIG. 7, the pedal 612 is positioned above the chassis body 611. The chassis body 611 comprises a guide rail 613. The pedal 612 is capable of movement along the guide rail 613, facilitating adjustment to a suitable position based on the utilization requirements of the carrying module 1.

In the embodiment depicted in FIG. 6, the host body 900 is a support frame module, consisting of multiple upright poles 910 and connecting plates 920. One ends of the upright poles 910 are securely affixed to the chassis unit 610, while the other end are connected to the connecting plates 920 and fixed beneath them. The carrying module 1 is positioned at one of multiple predetermined specific heights on the upright poles 910 through two fourth coupling devices 40. Specifically, each fourth coupling device 40 consists of a height adjustment device 41 and multiple lock holes 911. The lock holes 911 are arranged vertically along the upright poles 910. The height adjustment device 41 is mounted on the attachment bases 100, slidably encircling the upright pole 910, and locked onto the upright pole 910 through a selected lock hole 911. As the vertically implemented lock holes 911 vary in height, the choice of lock holes 911 engaged by the height adjustment device 41 dictates the installation height of the carrying module 1. The carrying module 1 of the caring machine 3 is additionally equipped with a push module 150, installed on the connecting plate to support the host body 900, controlling the movement of the caring machine 3.

Referring to FIG. 8 and in conjunction with FIG. 4, the present invention further provides a shifting machine 4, comprising a carrying module 1*a* and a host module 2. The carrying module 1*a* is additionally equipped with an attachment arm 102. The carrying module 1*a* is installed on the host module 2 through the fourth coupling device 40*a*.

The host module 2 which accommodates the carrying module 1*a*, consists of a host body 500, a shifting module 600*a*, and a top support module 800*a*. The attachment arm 102 is affixed to the host body 500, with its two ends serving to connect and lock the attachment base 100*a*. Both attachment bases 100*a* of the carrying module 1*a* are respectively installed on the ends of the attachment arm 102. The shifting module 600*a* comprises a chassis unit 610 and a wheel caster set 620. The wheel caster set 620 is pivotally connected to the side end of the chassis unit 610. The chassis unit 610 comprises a chassis body 611*a* and a pedal 612*a*, or a pedal module 630, with the host body 500 mounted on the chassis unit 610. The carrying module 1*a* is installed on the lifting bracket through the fourth coupling device 40*a*.

The host body 500 is a column-like module. The column module 500 comprises a fixed bracket 510 and a lifting bracket 520 which is positioned above the fixed bracket 510 and has the capability to vertically move on the fixed bracket 510, allowing for moving upwardly or downwardly.

In an embodiment, the fixed bracket 510 takes the form of a hollow square column. On the other hand, the lifting bracket 520 is designed as a hollow rectangular cylinder, which is inserted into the fixed bracket 510. During the vertical downward movement of the lifting bracket 520, it has the capacity to envelop the fixed bracket 510 and reach the lowest end of the fixed bracket 510. Multiple lock holes 5241 can be disposed at the surrounding surfaces of the rectangular cylinder lifting bracket 520. This design allows for the installation of various caring modules, such as the carrying module 1*a*, on the lifting bracket 520. These caring modules may be oriented differently, situated at various heights on the lifting bracket 520, and installed with diverse orientations, contributing to enhanced stability in the installation of caring modules on the lifting bracket 520.

The fourth coupling device 40*a* which is connecting the carrying module 1*a* to the column module 500, comprises a coupling interface 524 and a coupling module 522. The coupling interface 524 consists of the aforementioned multiple keyholes 5241, which are vertically arranged on the lifting bracket 520. The keyholes 5241 is designated as points of connection with the coupling module 522 at different heights. Meanwhile, the coupling module 522 is coupled to the attachment arm 102. In other word, the keyholes 5241 provides a variety of coupling points, enabling the carrying module 1*a* to be installed at several specific heights on the lifting bracket 520 through the fourth coupling device 40*a*. Besides, the coupling module 522 connects with the attachment arm 102 through the fifth coupling device 50. Meanwhile, in certain embodiments, multiple coupling modules 522 can be installed on the lifting bracket 520, allowing for adjustable installation heights. Furthermore, multiple coupling interfaces 524 can be arranged at different locations on the column module 500 as well. These interfaces may include, but not be limited to, various keyholes 5241 positioned on the lifting bracket 520.

Figure 9:
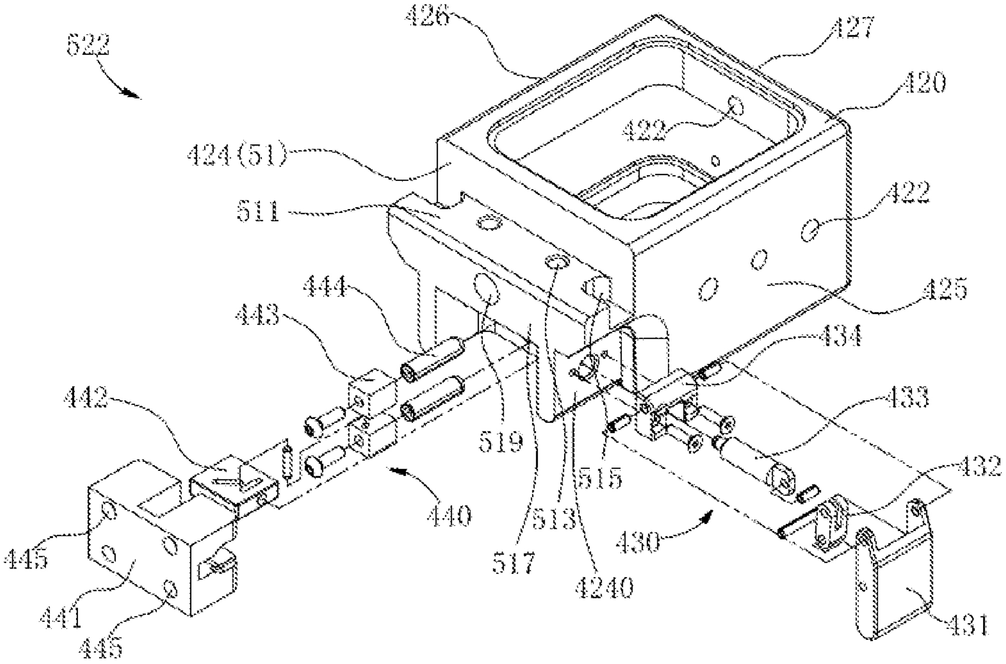
FIG. 9 is an exploded schematic diagram of an embodiment of the coupling module according to the present invention.

Referring to FIGS. 8 and 9, and also FIG. 4, the fifth coupling device 50 comprises a coupling port 51 and a coupling structure 53. The coupling port 51 is provided on the coupling module 522 and consists of a horizontal surface 511 and a vertical surface 517. The horizontal surface 511 extends from one side of the coupling module 522, and comprises multiple positioning holes 513, along with positioning grooves 515 on both sides. The vertical surface 517 is perpendicular to the horizontal surface 511 and comprises a mounting lock hole 519. The coupling structure 53, located at the center of the attachment arm 102, is configured to match the layout of the coupling port 51 and is secured to the coupling port 51 of the coupling module 522 via a quick-locking member 55.

The lifting bracket 520 is provided with multiple lock holes 5241 along the upright direction, and the coupling modules 522 are secured to the lifting bracket 520 through these lock holes 5241. The coupling modules 522 is suitable for the installation of various caring modules, thereby providing the caring machine 3 with diverse care functionalities. Furthermore, the height positions of different caring modules on the lifting bracket 520 can be adjusted by modifying the installation height of the coupling module 522. For instance, the carrying module 1*a* can be affixed to the lifting bracket 520 through the coupling module 522, and the height position of the carrying module 1*a* on the lifting bracket 520 can be altered by adjusting the installation height of the coupling module 522. Besides, the attachment arm 102 of the carrying module 1*a* can be securely fastened onto a coupling module 522. The coupling module 522 is then installed and secured on the lifting bracket 520 through the lock hole 5241, effectively securing the carrying module 1*a* to the host module 2.

The advantageous feature of the column module 500 in the present invention is that it enhances the vertical adjustable height range of the lifting bracket 520 during the ascending/descending process. This, in turn, expands the height adjustment capacity of the carrying module 1*a* when installed on the lifting bracket 520. Such an enlargement of the height adjustment range is beneficial in meeting diverse user application needs or human factors requirements for the carrying module 1*a* in various usage scenarios.

In addition to the column module 500, the host module 2 also comprises a shifting module 600 and a driving module 700. The shifting module 600 comprises at least a chassis unit 610 and a wheel caster set 620. The chassis unit 610 is positioned horizontally, and the wheel caster sets 620 are pivotally connected to both ends of the chassis unit 610. The wheel caster sets 620 can open and close to drive the host module 2 in motion, consequently moving the caring machine 3. The chassis unit 610 provides a flat upper surface and is connected to the fixing bracket 510, which is used to be a support for the column module 500. In one embodiment, the fixing bracket 510 is installed at the central position of the chassis body 611*a* to establish a connection between the column module 500 and the shifting module 600. This positioning of the fixed bracket 510 in the center of the chassis unit 610 aims to preserve the load balance of the caring machine 3 to ensure equilibrium and stability during movement.

Moreover, the receiving surface of the chassis body 611*a* designed to support the column module 500 is a flat upper surface. The upper surfaces (the pedals 612*a*) of the chassis body 611*a* on both sides of the column module 500 is used to serve as footrests for the user. The upper surface of the chassis body 611*a* can also provide stripes to boost friction and improve its anti-slip characteristics, thereby augmenting the user's stability while riding on the shifting machine 4.

The wheel caster set 620 comprises multiple universal wheel caster sets 622 and at least one directional wheel caster set 624. The universal wheel caster sets 622 can freely rotate on the horizontal plane without directional constraints. In the illustrated embodiment of FIGS. 6 and 8, the wheel caster set 620 is provided with at least four universal wheel caster sets 622. The four universal wheel caster sets 622 are pivotally mounted on each side of the chassis unit 610 through two long legs 621 and two short legs 623 and a pivot shaft 625. The long legs 621 and short legs 623 are secured below the chassis unit 610 through a locking plate (not shown), and the pivot shaft 625 is positioned beneath the chassis unit 610. That is, there is a long leg 621, a short leg 623 and two universal wheel caster sets 622 on each side end of the chassis unit 610. Each long leg 621 and each short leg 623 are provided with a universal caster set 622 at one end, while the other end is attached and fixed beneath the chassis unit 610. The universal wheel caster sets 622 mounted on the short legs 623 has a larger diameter compared to the one mounted on the long legs 621. Both the long legs 621 and the short legs 623 are equipped with control devices for managing the movement, positioning, and locking of the universal wheel caster sets 622. The two long legs 621 in the wheel caster set 620 can swing open and close, facilitating compatibility with auxiliary tools such as wheelchairs. Opening the two long legs 621 enhances the overall stability of the host module 1*a*.

To ensure better controllability and safety during shifting, the directional wheel caster set 624 is designed to rotate in a predetermined direction on the horizontal plane. It is positioned near the middle of the front side of the chassis unit 610, within a closed horizontal area formed by the vertices of the multiple universal wheel caster sets 622. The directional wheel caster set 624 comprises at least a directional wheel 627, an elastic device 628, and a switching device 626. The directional wheel 627 is movably installed below the directional wheel caster set 624 through the elastic device 628, allowing the axis position of the directional wheel 627 to move freely in the vertical direction. The elastic device 628 ensures that the directional wheel 627 maintains contact with the ground throughout the movement, guaranteeing its effectiveness. The switching device 626 is positioned close to the directional wheel 627 and can control the directional wheel 627 to move in a specific direction or allow it to move freely. In simpler terms, the switching device 626 enables two modes for the directional wheel 627. When engaged, the directional wheel 627 is fixed in a specific forward direction, ensuring the movement of the displacement module 600/600*a* in the preset direction. Conversely, when disengaged, the directional wheel 627 operates freely, similar to a universal wheel, allowing the displacement module 600/600*a* to move in any direction. The switching operation is achieved through a mechanism like positioning pins and holes (not shown in the figure) on the switching device 626 and directional wheel 627. By coupling or decoupling, the directional wheel 627 can be set in either a directional or non-directional state, accommodating various shifting requirements. Moreover, the directional wheel caster set 624, along with the pedal 612 shown in FIG. 6, can move relative to the long leg 621 toward the short leg 623. This configuration enhances the stability, ease of control, and convenience of movement for both the shifting module 600/600*a* and the host module 1*a*.

The driving module 700 is positioned on the chassis unit 610 to facilitate the vertical movement of the lifting bracket 520. The driving module 700 comprises a motor, a transmission component, and a control component. The chassis unit 610 has a box-like structure, and when placed horizontally, it is positioned beneath the flat upper surface of the pedal 612*a*. The motor and control components of the driving module 700 are housed within the box-like structure, while the transmission components extend from the interior of this structure to the column module 500. Besides, the transmission member can reach inside the lifting bracket 520. When the motor-driven transmission member moves up or down, it imparts vertical movement to the lifting bracket 520. The lifting bracket 520 can be securely positioned at a set height during this movement. By adjusting the height of the lifting bracket 520 using the driving module 700, the utilization height of the column module 500 can be modified, accommodating the diverse usage requirements of various scenarios and enhancing the adaptability of the caring machine 3.

Please refer to FIG. 9 in conjunction with FIG. 8. FIG. 9 is an exploded schematic diagram of an embodiment of the coupling module in the present invention. The coupling module 522 at least comprises a main body 420, a control member 430, and a positioning member 440. The main body 420 of the coupling module 522 is a hollow structure with a through hole. The coupling module 522 is positioned on the column module 500 through the hollow through hole, allowing the coupling module 522 to move and lock onto the column module 500 through the control member 430 and the positioning member 440. Furthermore, the coupling module 522 can be secured to the column module 500 using a fastener and the mounting hole 422 on the main body 420, thereby enhancing the stability of the coupling module 522 on the column module 500.

Following the positioning of the coupling module 522 on the column module 500, the main body 420 can move along the column module 500 through the coordinated action of the control member 430 and the positioning member 440. The main body 420 comprises four coupling interfaces, with the control member 430 and the positioning member 440 installed beneath the first coupling interface 424. Besides, the second coupling interface 425, the third coupling interface 426, and the fourth coupling interface 427 are provided with multiple mounting holes 422. In one embodiment, the second coupling interface 425 and the third coupling interface 426 are symmetrically arranged, and the fourth coupling interface 427 is positioned opposite the first coupling interface 424.

A connecting member 4240 is disposed beneath the first coupling interface 424. The control member 430 comprises a handle 431, a connecting rod 432, a push-pull rod 433, and a fixed base 434. The fixed base 434 can be securely fastened to the connecting member 4240 using screws. The push-pull rod 433 has one end fixed to the connecting rod 432 through a fixing pin, and its other end passes through the fixed base 434 to connect with the positioning member 440. The connecting rod 432 and the fixed base 434 can be affixed to the handle 431 through fixing pins. The positioning member 440 includes a fixed block 441, a sliding block 442, multiple positioning pin seats 443, and multiple positioning pins 444. In this embodiment, the positioning member 440 comprises two positioning pin seats 443 and two positioning pins 444. The two positioning pins 444 traverse the connecting member 4240 and the main body 420 to engage with the lock hole 5241 of the column module 500, and the two positioning pins 444 are arranged in parallel in an up-and-down orientation. The sliding block 442 is securely mounted between the two positioning pin seats 444 using fixed pins, and then the two positioning pin seats 443 are respectively installed and secured on the two positioning pins 444 using screws. Meanwhile, one end (movable end) of the push-pull rod 433 from the control member 430 connects to one side end of the sliding block 442. The other end of the sliding block 442 is positioned towards the fixed block 441, adhering to and sliding with the fixed block 441. A plurality of mounting holes 445 are provided on the side of the fixed block 441, away from the sliding block 442.

The control member 430 and the positioning member 440 are disposed on different sides of the connecting member 4240 beneath the first coupling interface 424. In the illustrated embodiment, both the control member 430 and the positioning member 440 are mounted on the connecting member 4240 beneath the first coupling interface 424 of the main body 420, with the control member 430 and the positioning member 440 arranged vertically. When the coupling module 522 is affixed to the column module 500, the handle 431 of the control member 430 is positioned close to one side of the column module 500. As the handle 431 of the control member 430 moves upward (away from the column module 500), the push-pull rod 433 connected to the handle 431 drives the sliding block 442 in a direction away from the column module 500. Consequently, the sliding block 442 impels the two pins 444 of the positioning members 440 to move in a direction away from the column module 500, disengaging from the lock hole 5241 of the column module 500 corresponding to the two positioning pins 444. Meanwhile, the positioning member 440 is separate from the column module 500, allowing the coupling module 522 to move up and down on the column module 500. The distance between the two positioning pins 444 matches the distance between two adjacent lock holes 5241 on the column module 500. Furthermore, the carrying module 1 or 1*a* can be attached and secured to any one of the first coupling interface 424, the second coupling interface 425, the third coupling interface 426, and the fourth coupling interface 427 of the coupling module 522. Thus, the carrying module 1 or 1*a* is securely fastened to the column module 500. In the embodiments depicted in FIGS. 1 and 8, the carrying modules 1 and 1*a* are coupled with the first coupling interface 424 of the coupling module 522. In other words, in these two embodiments, the coupling interface 424 of the third coupling module 522 serves as the coupling port 51 in the aforementioned fifth coupling device 50.

Referring again to FIG. 8 in conjunction with FIG. 1, the shifting machine 4 can further comprises a top support module 800*a*, which is installed in the host module 2 and positioned adjacent to the column module 500.

The top support module 800*a* comprises a top supporting frame 810*a* and a supporting member 820. The top supporting frame 810*a* can be directly affixed to the column module 500 or secured at a desired height position on the column module 500 through the coupling module 522. The supporting member 820 is fixed onto the top supporting frame 810*a* and may be an elastic buffer member characterized by a rectangular parallelepiped shape and a specific thickness. The supporting member 820 is used to provide assistance for the user's knees and faces toward the carrying module 1*a*. Besides, each side of the elastic buffer is equipped with a strap member, enabling the user to fasten and secure their legs. It ensures that the user's knees are supported and fixed on the supporting module 800*a*, thereby averting the risk of knee injuries during movement or exercise. When the user is in a standing position, their knees can lean against the top support module 800*a* to aid in standing and safeguard the knees.

The shifting machine 4 may also include two pedal modules 630, and is installed on one side of the chassis unit 610 within the host module 2, and capable of being folded towards the chassis unit 610. In one embodiment, the pedal module 630 can be mounted on the chassis unit 610 using a hinged-type folding mechanism. The hinge-type folding mechanism is affixed to the chassis unit 610, and the pedal module 630 is detachably connected to this mechanism, facilitating quick installation and disassembly. As illustrated in FIG. 8, the pedal module 630 consists of a fixed base 631, a pivot plate 632, and a pedal 633. The fixed base 631 is installed on one side of the chassis unit 610. The pivot plate 632 is pivotally coupled to the fixed base 631 and can be folded towards the chassis unit 610. The pedal 633 is securely fastened to the pivot plate 632 through the quick locking assembly 635 and can be folded towards the chassis unit 610 as the pivot plate 632 moves. Both pedal modules 630 can be positioned on one side of the chassis unit 610 and on either side of the column module 500, and disposed close to the center of the pedal 612*a* on the chassis unit 610. When the two pedal modules 630 are horizontally positioned, users can place their feet on the two pedal modules 630 if users cannot reach the pedals 612*a* of the chassis unit 610. When not in use, the two pedal modules 630 can be folded upward toward one side of the chassis unit 610. These pedal modules 630 may be designed with a stripe-like or small hole structure to enhance friction and improve anti-skid properties, contributing to increased stability for users when riding on the shifting machine 4.

The pedal module 630 is an integral member and enables users to place their feet when riding on the carrying module 1*a*. The pedal module 630 can be installed on one side of the chassis unit 610, and is positioned adjacent to the middle of the pedal 612*a*. The pedal module 630 may feature a stripe-like or small hole structure to enhance friction and improve anti-slip properties, thereby further increasing user stability when using the shifting machine 4.

The shifting machine 4 may include a push module 150*a*, which is typically installed on the rear side of the column module 500, considering the column module 500 of the host module 2 as the reference point (with the user side as the front and the side where the caregiver stands as the rear). The push module 150*a* is designed for pushing or pulling the shifting machine 4. In other words, the push module 150*a* generally faces the direction of the caregiver or, when the user utilizes the shifting machine 4, it is positioned in front of the user. The push module 150*a* can be securely attached to the column module 500 through a locking unit. When a disabled user stands on the shifting machine 4, the push module 150*a* serves as a support member for the user to grasp, thereby helping to maintain the user's stability and balance while standing. When a disabled user rides on the carrying module 1*a*, a caregiver or assistant can move or transfer the disabled user by pushing or pulling the shifting machine 4 using the push module 150*a*.

The specific usage scenarios of the shifting machine 4/caring machine 3, equipped with the carrying module 1*a* or 1*b* and the host module 2 or 2*a* according to the present invention, will be further introduced or explained below. However, the functions of the machine 4/caring machine 3 are not limited to this.

Scenario 1: When the two guardrails 200 of the carrying module 1*a*/1*b* are closed inward and locked with the backrest assembly 400, the user can sit on the two load plates 300 of the carrying module 1*a*/1*b*, and the user's feet can be placed on the upper surface of the chassis body 611*a* (pedal 612*a*) and/or on the pedal module 630 (carrying module 1*a*), or on the pedal 612 (riding module 1*b*). The user's hands can be placed and leaned on the attachment arm 102 of the carrying module 1*a*. Depending on the user's situation after sitting down or during standing, the user's knees can also be supported and abutted by the top support module 800*a*/800. The caregiver can hold the push module 150*a*/150 with his or her hand to assist the user in riding on the carrying module 1*a*/1*b* stably.

Scenario 2: After the user rides stably on the carrying module 1*a*/1*b*, the caregiver can push or pull the shifting machine 4/caring machine 3 to move by using the push module 150*a*/150, and thus move the user. For instance, the shifting machine 4/caring machine 3 can be positioned in front of a toilet, aligning the loading module 1*a*/1*b* above the toilet. The opening 312 formed when the two load-bearing plates 300 are laid flat and closed can be utilized. Meanwhile, by adjusting the height position of the loading module

1*a*/1*b* on the column module 500/support frame module 900, the user can move the shifting machine 4/nursing machine 3 to the toilet by his own.

Scenario 3: The user can use the shifting machine 4/caring machine 3 for rehabilitation exercises. Lock the universal wheel caster set 622 on the wheel caster set 620 of the shifting machine 4, and the caregiver can stabilize the shifting machine 4/caring machine 3 by using the push module 150*a*/150, while folding and storing the two pedal modules 630 or moving the pedal 612 to an appropriate position. The user can grip the long rod 211 of the guardrail 200 with hands and, meanwhile, lift the two load-bearing plates 300 towards one side of the guardrail 200, securing them on the side of the guardrail 200. Subsequently, with assistance from the carrying module 1*a*/1*b*, the user can stand. After the user stands, the locking of the universal wheel set 622 can be released, and the caregiver or assistant can hold the push module 150*a*/150. The user can then engage in rehabilitation exercises, such as lower limb walking, with the assistance of the shifting machine 4/caring machine 3 and the caregiver.

Scenario 4: Lock the universal wheel caster set 622 of the wheel caster set 620 on the shifting machine 4/caring machine 3, and the caregiver or assistant can hold the transfer module 150*a*/150. The two pedal modules 630 are positioned horizontally, aligning their plane with the upper surface of the chassis body 611*a*, or the pedal 612 is adjusted to an appropriate position. The user's feet are then placed on the upper surface of the chassis body 611*a* (pedal 612*a*) and/or the pedal module 630/pedal 612, while the user's hands grasp the push module 150*a*/150 to undergo assisted standing training, enhancing rehabilitation and engaging in lower limb exercises. During this period, the caregiver or assistant's hands secure the push module 150*a*/150 to maintain the balance of the shifting machine 4/caring machine 3, and additional accessories may be utilized to assist the user in standing. As the user stands, the knees can be supported and abutted by the top support module 800*a*/800 on the shifting machine 4/caring machine 3, preventing knee injuries and aiding the user in standing.

To sum up, the present invention provides a carrying module and an auxiliary tool system incorporating a caring machine and a lift, and equipped with various functional modules. This system is designed to provide assistance to individuals with disabilities and offers a range of care functions. These functions include, but are not limited to, facilitating disabled individuals to ride, aiding in walking, assisting with toilet use, and supporting standing. In summary, the system, including the lift/caring machine utilizing the carrying module, offers diverse care functions that can be tailored based on usage requirements. Its versatility eliminates the need to switch between different types of lifts for various care functions, thereby saving the user's care-related expenses.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A carrying module that is detachably installed on a host module, the carrying module comprising:

two attachment bases, installed on the host module;

two guardrails, rotatably connected and locked to the attachment bases through a first coupling device respectively;

two load-bearing plates, rotatably installed at the bottom of the guardrails through a second coupling device respectively, wherein when the load-bearing plates are lifted upward, the load-bearing plate closely aligns with the guardrails, and when the load-bearing plates are placed horizontally, the load-bearing plates are used to carry a load; the second coupling device comprises a rotating shaft rod and a pivot groove, the rotating shaft rod is installed at the bottom of the guardrail and is equipped with a plurality of limit pins; the pivot groove, that is disposed on one side of the load-bearing plate for receiving the rotating shaft rod, comprises a plurality of long holes used to accommodate the limit pins so that the load-bearing plates are positioned horizontally for carrying loads and lifted upward to approach or move away from the guardrail; and a backrest assembly, connected and locked to the two guardrails through a third coupling device, the backrest assembly comprises a seatback base and a seatback, wherein the seatback base is connected to at least one of the two guardrails through the third coupling device, the seatback is detachably coupled to the seatback base, wherein the third coupling device comprises at least one pivot-mounted locking device installed on the coupling end of the seatback base and the guardrails so that the seatback base may rotate horizontally around the guardrails.

2. The carrying module according to claim 1, wherein the backrest assembly comprises the seatback base and the seatback, the third coupling device comprises two of the pivot-mounted locking devices, each of the pivot-mounted locking devices comprising:

a pivot pipe sleeve, pivotally coupled to the guardrail through a positioning groove; and a hook locking member, installed on the seatback base, capable of detachably connecting and locking with the positioning groove on the pivot pipe sleeve, thereby maintaining consistent up and down, front and rear positions of the two guardrails, wherein when only one side of the hook locking member on the seatback base is engaged with the pivot pipe sleeve, the seatback base and the pivot pipe sleeve can rotate at any angle.

3. The carrying module according to claim 2, wherein each of the first coupling device comprises:

a pivot device, connecting the attachment base and the guardrail to enable the guardrail to rotate horizontally around the attachment base; and a self-locking positioning device, installed on both the attachment base and the guardrail;

wherein when the guardrail pivots to a specific position relative to the attachment base, the self-locking positioning device automatically locks the guardrail in place.

4. The carrying module according to claim 3, wherein the pivot device comprises a pivot hole that is positioned at one end of the guardrail, and is used to receive the rotating shaft of the attachment base;

the self-locking positioning device comprises at least one positioning hole and at least one positioning pin that are arranged respectively and correspondingly on the attachment base, wherein when the guardrails are closed or in a specific orientation, the positioning pin installed on either the attachment base or guardrail automatically engages with the positioning hole on the guardrail or attachment base, thereby limiting the horizontal rotation of the guardrail.

5. The carrying module according to claim 1, wherein the second coupling device further comprises a positioning device installed on the guardrail, when the load-bearing plates are lifted upward, the positioning device prevents the load-bearing plates from falling; each of the two load-bearing plates further comprises an arc-shaped notches, when the two load-bearing plates are positioned flat and closed, their respective arc-shaped notches face each other so that an opening is formed.

6. A caring machine capable of being combined with various caring modules to offer diverse care functions, the caring machine comprising the carrying module and the host module according to claim 1, wherein:

the host module comprises:

a host body, on which two attachment bases are installed; and a shifting module, comprising a chassis unit and a wheel caster set, wherein the wheel caster set is pivotally connected to the side end of the chassis unit, the chassis unit comprises a pedal, the host body is mounted on the chassis unit;

the chassis unit further comprises a chassis body, the pedal is installed above the chassis body of the chassis unit, the chassis body further comprises a guide track to allow the pedal to be moved along the guide track;

the host body of the host module is a supporting frame module and comprises a plurality of upright poles and connecting plates, one end of each upright poles is attached and fixed to the chassis unit, while the other end of each upright poles is connected and fixed below the connecting plates, the carrying module is mounted on one of the upright poles with specific heights through the two fourth coupling devices; and the caring machine further comprises a push module installed on the support frame module and responsible for controlling the movement of the host module.

7. The caring machine according to claim 6, wherein each of the fourth coupling devices comprises a height adjustment device and a plurality of lock holes arranged along the upright direction of the upright pole, the height adjustment device is installed on the attachment base, a sliding sleeve disposed on the upright pole is secured by locking it into the upright pole through the lock holes.

* * * * *